United States Patent [19]

Goodrich

[11] Patent Number: 4,878,926
[45] Date of Patent: Nov. 7, 1989

[54] DUST COLLECTOR

[75] Inventor: Robert L. Goodrich, Charlotte, N.C.

[73] Assignee: Pneumafil Corporation, Charlotte, N.C.

[21] Appl. No.: 232,808

[22] Filed: Aug. 16, 1988

[51] Int. Cl.⁴ .............................................. B01D 41/00
[52] U.S. Cl. ......................................... 55/294; 55/302
[58] Field of Search .................. 55/273, 284, 294, 302

[56] References Cited

U.S. PATENT DOCUMENTS

| | | | |
|---|---|---|---|
| 3,487,609 | 1/1970 | Caplan | 55/294 X |
| 3,648,442 | 3/1972 | Bourne | 55/294 |
| 3,951,627 | 4/1976 | Barr et al. | 55/284 |
| 4,157,899 | 6/1979 | Weaton | 55/273 |

*Primary Examiner*—Charles Hart
*Attorney, Agent, or Firm*—Shefte, Pinckney & Sawyer

[57] ABSTRACT

A reverse air dust collector having a housing and a partition plate dividing the housing into a clean air chamber and a dirty air chamber, with filter elements depending from the partition plate into the dirty air chamber so that air with entrained particles can pass through the filter elements and into the clean air chamber through openings in the partition plate. A centrifugal blower for generating a flow of cleaning air is fixed to a plenum chamber as an integral unit, and this unit is fixed to a stanchion member mounted for rotation about a vertical axis in the clean air chamber, with the plenum chamber and the blower being arranged on opposite sides of the axis of rotation. A drive arrangement is provided for the stanchion member which permits the driving gear to be pivotally displaced away from the driven gear fixed to the stanchion member in the event rotation of the stanchion member is prevented.

6 Claims, 4 Drawing Sheets

DUST COLLECTOR

BACKGROUND OF THE INVENTION

The present invention relates generally to dust collectors of the type employing self-cleaned filter elements for removing foreign particles from air or other gaseous mediums, and particularly to a unique mounting and drive arrangement for the blower and plenum utilized to clean the filter elements in the dust collector.

Dust collectors that employ self-cleaned filters typically include a housing that is divided by a partition plate or wall into a clean air section and a dirty air section, with a plurality of filter elements (e.g. filter bags) depending from the partition plate into the dirty air section so that air with particles entrained therein can be introduced into the dirty air section and passed through the filter elements whereby the entrained particles are collected on the exterior surfaces of the filter elements and the filtered air flows upwardly from the interior of the filters through openings in the partition and into the clean air section for exhaustion therefrom. Obviously, over time the exterior surfaces of the filter elements will accumulate collected particles to the point where insufficient air can pass through the filter, and to avoid this condition, and to avoid having to replace the filter elements every time they reach this condition, virtually all modern industrial dust collectors include some arrangement for periodically cleaning the filter elements. One well-known system for cleaning the filter elements is a so-called reverse air system in which a blower, usually a centrifugal blower, discharges a continuous stream of cleaning air into a cleaning plenum that continuously rotates over the surface of the partition plate so that cleaning air is directed into the openings in the partition plate through nozzles or openings in the rotating plenum.

An earlier reverse air dust collector is disclosed in Barr et al U.S. Pat. No. 3,951,627, in which the drive motor for the blower is fixed near the center of the clean air section of the housing, and a relatively long shaft extends through the wall of the plenum for rotating the blower impeller at speeds of about 3400 r.p.m. The plenum itself is mounted for rotation about the same axis as the impeller, and it extends radially outwardly a considerable distance to cover the entire surface of the partition plate as it rotates thereacross with a slide plate interposed between the plenum and the surface of the partition plate to facilitate movement of the rotating plenum over the somewhat irregular surface of the partition plate. Since the blower impeller is within the confines of the plenum, it was necessary to provide the rotating plenum with a venturi inlet for admitting inlet air to the inlet of the impeller, which created a practical problem in commercial embodiments of the dust collector. More specifically, the long reach and essentially cantilever support for the plenum, and the uneven surface of the partition plate on which it slides, creates wobbling movement of the plenum as it rotated, and this wobbling movement results in the venturi air inlet on the rotating plenum moving toward and away from the inlet of the rotating impeller. If too large a spacing is provided between these two moving elements, excessive turbulence is created in the flow of inlet air through the inlet venturi because of the break in the smooth surface of the inlet venturi and because of possible recirculation of pressurized air in the plenum back through the spacing On the other hand, if these elements are located too close to one another, they will contact one another and create substantial and dangerous heat resulting from the frictional contact between the moving elements, and in some cases the elements would be severely damaged. Additionally, the floating slide plate between the plenum and partition plate would sometimes create jamming of the plenum when the surface of the partition plate became particularly uneven, and the required extended motor shaft is expensive and can create stability problems when the impeller is mounted at the extending end of the shaft.

In an effort to overcome some of the drawbacks of the above-described reverse air dust collector, a more recent model of a reverse air dust collector is provided with a centrifugal blower and its motor that are both mounted at a fixed position within the clean air section of the housing, and the plenum is mounted for rotation over the partition plate. With this arrangement, the outlet of the fixed blower is directed downwardly, and this outlet discharges into the rotating plenum through a 90-degree elbow that is attached to the plenum for rotation therewith and that must be connected to an expensive swivel joint capable of providing a generally air-tight connection between a fixed outlet conduit, the blower and the rotating inlet of the elbow. Also, the elbow, at its exhaust end, is attached to the plenum through a flexible joint that permits some "play" of the plenum whereby it can ride on the surface of the partition plate during rotation so that the cleaning air discharged from the plenum can pass directly into the filters with a minimum loss of velocity. While reverse air dust collectors of this general type have proved to be satisfactory in operation, the expense involved in providing the aforesaid swivel joint and elbow increases the cost of the apparatus, and the efficiency of the cleaning arrangement is reduced by the fact that the air discharged from the blower must change direction several times before being admitted to the filters.

By the present invention, a reverse air dust collector includes a unique mounting arrangement and drive for the blower, its motor, and the plenum which overcomes the drawbacks discussed above in connection with conventional reverse air dust collectors.

SUMMARY OF THE INVENTION

The present invention relates to a dust collector having a housing in which plurality of filter elements are secured to a grid plate for receiving cleaning air through openings in the grid plate, and that includes a blower providing a continuous flow of cleaning air that is delivered to a plenum means for discharging such cleaning air into the openings in the grid plate for cleaning the filter elements. A stanchion member is disposed with its extending length arranged generally perpendicular with respect to the grid plate, and the stanchion member is mounted within the housing for rotation about the axis of its extending length. The blower, preferably with its motor, and the plenum are mounted together as a fixed integral unit to the rotatable stanchion member for rotation therewith, with the plenum being disposed on one side of the axis of rotation of the stanchion member and having its extending length disposed generally radially with respect to such axis of rotation, and the blower is disposed on the opposite side of the axis of rotation with its discharge end fixed directly to the plenum so that air discharged from the blower travels directly into the plenum in a flow path that is essentially straight and directed along the extending length of the plenum. A drive arrangement is provided for rotating the stanchion member, the plenum, and the blower as an integral unit about the axis of rotation of the stanchion member.

Preferably, the blower is a centrifugal blower having a motor unit fixed thereto, and having a rotating impeller and an air discharge end which is disposed generally tangentially with respect to the path of the rotating impeller. Also, the drive arrangement for the stanchion, plenum, and blower preferably includes a driven gear fixed to the stanchion, a drive motor and drive gear for engaging the driven gear to impart rotation thereto, and a pivot plate pivotally supporting the drive motor and drive gear and arranged so that the weight of the pivot plate and the elements supported thereby will cause the pivot plate to normally move to a first position at which the drive gear engages the driven gear to rotate the stanchion, and will also permit the pivot plate to move away from the driven gear a sufficient distance to disengage the two gears and rotation of the plenum is prevented.

DESCRIPTION OF THE PREFERRED EMBODIMENT

Figure 1:
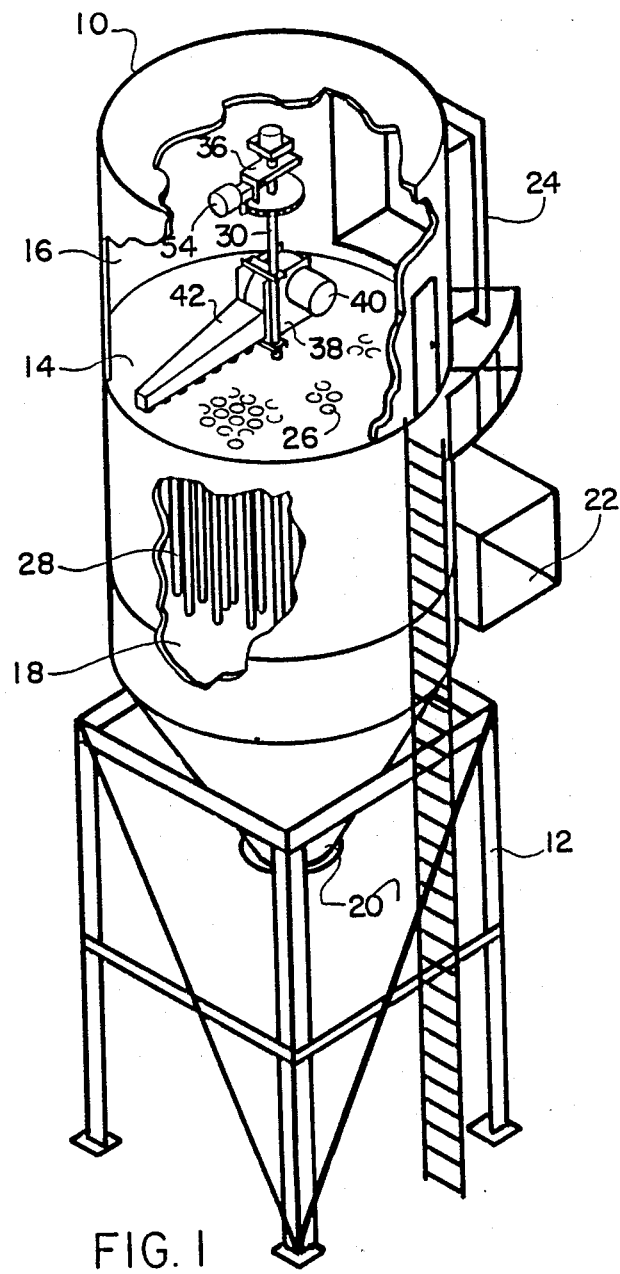
FIG. 1 is a diagrammatic perspective view of a reverse air dust collector embodying the present invention.

Looking now in greater detail at the accompanying drawings, FIG. 1 illustrates, in somewhat diagrammatic form, a reverse air dust collector embodying the present invention. The dust collector includes a housing 10 that may be mounted on a support 12, the housing 10 having a partition plate or grid plate 14 extending thereacross to divide the housing 10 into an upper clean air section 16 and a lower dirty air section 18 having a hopper 20 at the bottom end thereof for discharging collected dust therethrough. The lower section 18 has an inlet 22 through which air or other gaseous mediums having entrained particles or dust therein is introduced into the lower chamber 18, and the upper clean air chamber has an outlet 24 through which cleaned air leaves the housing 10. The grid plate 14 has a plurality of openings 26 formed therein, and individual filter elements 28, such as conventional filter bags made from fabric, are connected to the grid plate 14 so as to depend or hang downwardly therefrom (See FIG. 3) at each of the openings 26. Briefly summarized, the operation of the dust collector, which is well known in the art, includes introducing air with entrained particles through the inlet 22, after which the air passes radially inward through the surface of the filter bags 28 so that particles or dust entrained in the air are deposited on the exterior surface of the bag with the cleaned air then passing upwardly through the openings 26 and into the clean air section 16, and then the cleaned air is exhausted through outlet 24.

Since it is also well known in the art that the filtering elements must be periodically cleaned, it is conventional practice to provide some arrangement for periodically dislodging and removing the dust or foreign matter that has collected on the exterior surface of the filter elements, and one typical arrangement designed for this purpose is to provide a continuous stream of air that is periodically admitted into the interior of the filter bags 28 through the openings 26 at a sufficiently high velocity to cause this cleaning air to pass outwardly through the surface of the filter elements, in a direction reversed from the normal air flow, to dislodge dust particles from the exterior surface of the filters, whereby the dislodged particles will fall by gravity into the hopper 20 at the lower end of the bottom section 18 for removal from the housing. The present invention provides a unique mounting and drive arrangement for such a cleaning apparatus.

Figure 2:
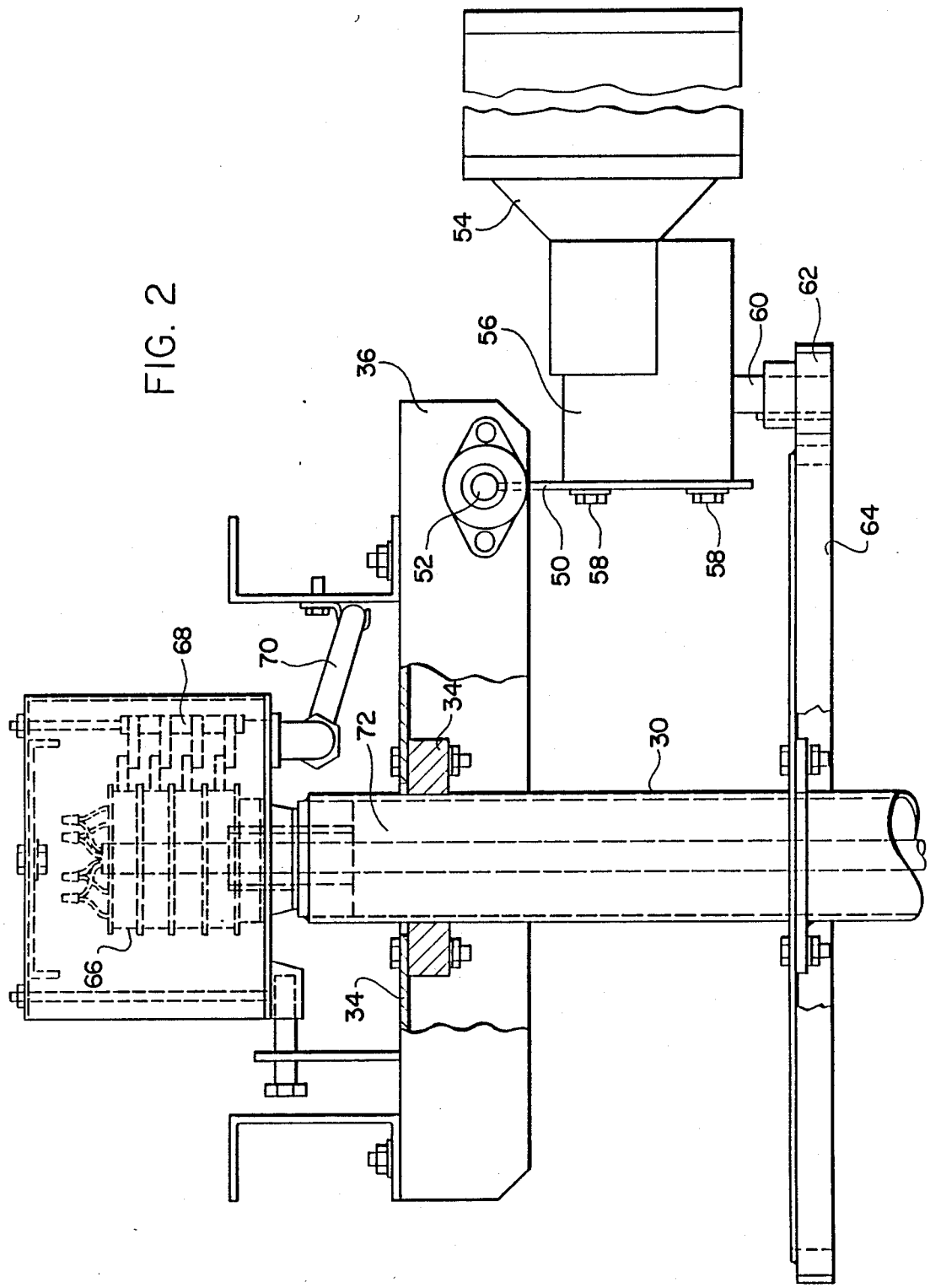
FIG. 2 is a partial sectional view illustrating the drive arrangement for the blower and plenum.
Figure 3:
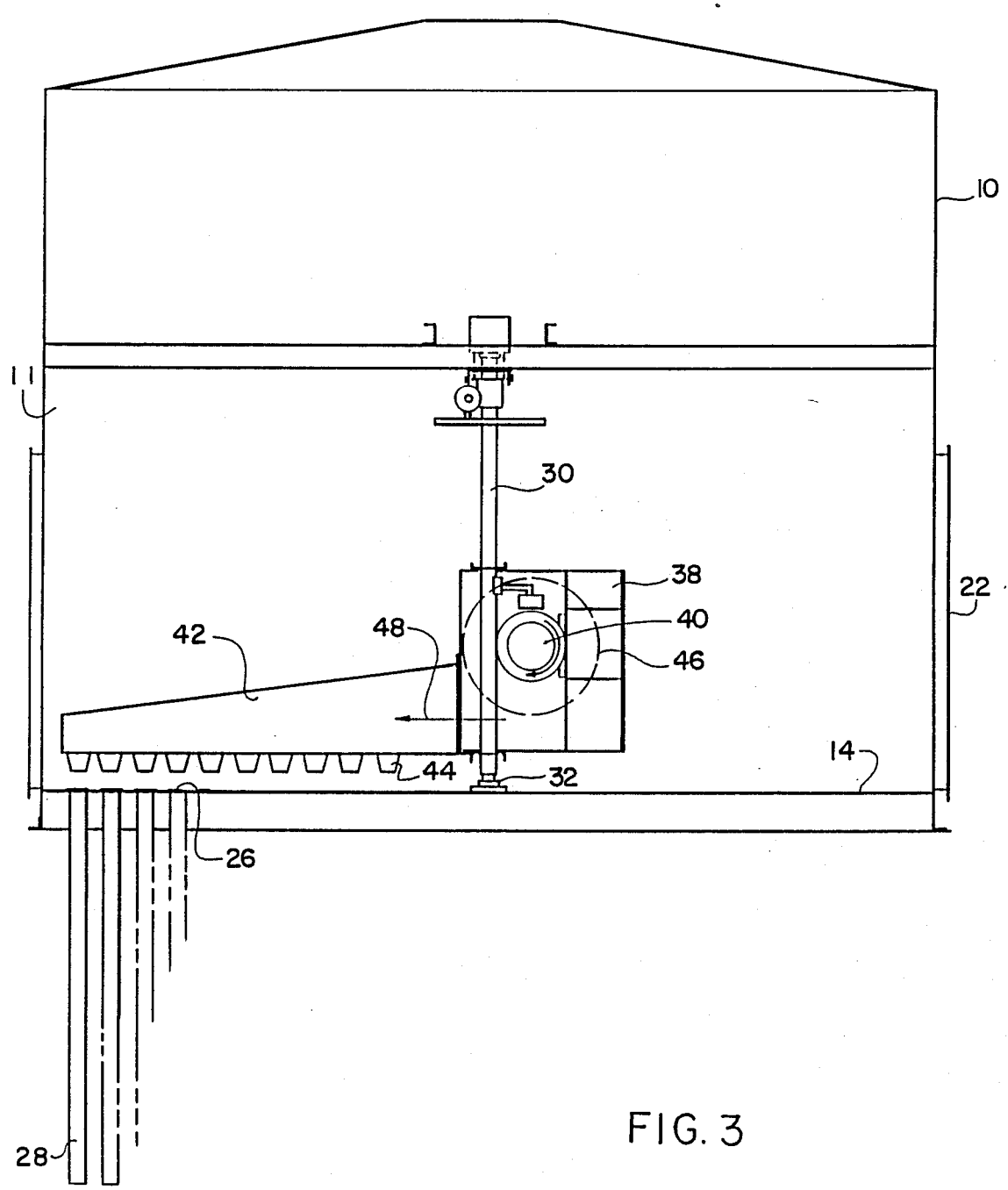
FIG. 3 is a diagrammatic side elevational view illustrating the mounting arrangement for the plenum and blower.

More specifically, the dust collector of the present invention includes a stanchion member 30 disposed with its extending length arranged generally perpendicular with respect to the grid plate 14, and being mounted for rotation about the vertical axis of its extending length, such mounting including a bearing 32 fixed to the grid plate 14 at the lower end of the stanchion member 30 (See FIG. 3) and an upper bearing 34 carried in a fixed support 36 (See FIG. 2). Adjacent the lower end of the stanchion member 30 a centrifugal blower 38 and its drive motor 40 are rigidly fixed to a plenum chamber 42 that extends radially outwardly with respect to the stanchion member 30 across the upper surface of the grid plate 14, the plenum 42 having plurality of nozzles or outlets 44 that are arranged to coincide with the openings 26 in the grid plate 14 as the plenum chamber 42 is rotated across the surface of the grid plate 14 in a manner to be described presently. As best seen in FIG. 3, the impeller 46 of the centrifugal blower 38 rotates about a horizontal axis to generate a tangential flow of air indicated by the directional arrow 48 so that such air flow can travel in essentially a straight line directly into the plenum chamber 42 along the extending length thereof, whereby there is little or no frictional losses associated with this air flow as would be the case in the prior art arrangements discussed above where the air flow is required to change directions at least several times between the blower and the plenum. The integrated unit that includes the blower 38, its motor 40, and the plenum chamber 42 is mounted as a unit directly to the stanchion member 30 for rotation therewith, and, as best seen in FIG. 2, the blower 38 and its motor 40 are disposed on one side of the axis of rotation of the stanchion member 30 and the radially extending plenum chamber 42 is disposed on the opposite side of such axis of rotation whereby the weight of these respective members tend to counterbalance one another so that a smaller and less expensive mounting arrangement for the stanchion member 30 can be used, as compared with the mounting arrangement that would be required if most or all of the total weight of the elements is disposed only at one side of the axis of rotation.

Figure 4:
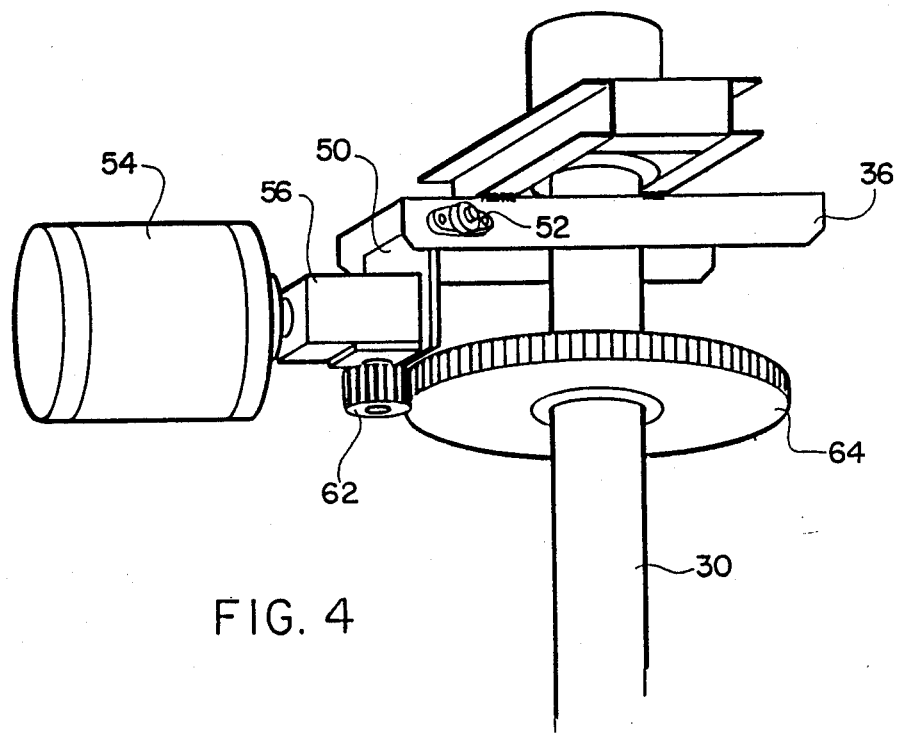
FIG. 4 is a detailed view, in perspective, showing the drive arrangement for the plenum and blower.

The drive arrangement for the stanchion member 30, and therefore the blower 38, motor 40, and plenum 42 rigidly fixed thereto, is best illustrated in FIGS. 2 and 4, and it includes a pivot plate 50 mounted in the fixed support 12 by a pivot shaft 52. A drive motor 54 and a speed reducer unit 56 are secured directly to the pivot plate 50 by bolts 58 so as to extend outwardly from the pivot plate 50 at one side thereof. The output shaft of the motor 54 is connected to the input of the speed reducer unit 56 in a conventional manner (not shown), and the speed reducer 56 includes an output shaft 60 extending in a direction generally parallel to the pivot plate 50 and having a drive gear 62 attached at its extending end for rotation therewith. The drive gear 62 meshes with a larger driven gear 64 that is secured directly to the stanchion member 30 so that operation of the drive motor 54 causes rotation of the drive gear 62 and the driven gear 64, whereby the stanchion element and the members secured thereto are rotated about the vertical axis of the stanchion member 30. In normal operations, the weight of the drive motor 54 and the speed reducer 56 are selected so as to cause the pivot plate 50 to hang in an essentially vertical disposition with the drive gear 62 meshed with the driven gear 64, and such weight is sufficient to maintain the two gears in an operative driving relationship. However, if for any reason the rotation of the stanchion member 30 should be prevented, such as, for example, if the plenum chamber 42 should become jammed against the surface of the grid plate 14, the pivotal mounting of the pivot plate 50 wil result in the driving force applied to the drive gear 62 causing such drive gear to be pivoted away from the now stationary driven gear 64, and further driving rotation of the drive gear 62 will simply result in the drive gear 62 moving away from and toward the driven gear 64 as the pivot plate 50 pivots about its pivot shaft 52. Thus, in a situation where the integrated stanchion member arrangement should become jammed against rotation, the present invention permits the drive motor 54 to continue driving the drive gear 62 without destroying the drive motor 54 or the meshing gears 62, 64. Additionally, this drive arrangement permits maintenance personnel to simply disengage the drive gear 62 and the driven gear 64 by pivoting the pivot plate 50 upwardly until the drive motor 54 rests on the fixed support 12, after which such maintenance personnel can readily rotate the plenum chamber 42 and the stanchion member 30 manually for routine maintenance and repair purposes.

Since the blower motor 40 is fixed to the stanchion member 38 and rotates continuously therewith, the present invention also includes an arrangement for continuously supplying electrical energy to the blower motor 40 while it is rotating. As best seen in FIG. 2, the upper end of the stanchion member 30 is fixed to the rotatable portion 66 of a conventional slip ring assembly that also includes a stationary portion 68 which receives electrical current from any convenient source through electrical line 70. Therefore, as the stanchion member 30 rotates, electrical current is transferred from the fixed portion of the slip ring assembly to the rotatable portion of the slip ring assembly, and this electrical current is carried by a second electrical line 72 that passes down the center of the hollow stanchion member 30 to the blower motor 40.

The unique mounting arrangement for the plenum 42, the blower 38 and its motor 40, and the unique combination of this mounting arrangement with the drive arrangement situated on pivot plate 50, offers substantial advantages as compared to the conventional reverse air dust collectors described above. In particular, it is significant that the mounting arrangement of the present invention eliminates entirely the problem of having to mount, at close tolerances, a rotating plenum having an air inlet disposed immediately adjacent a fixed, non-rotatable inlet conduit as was the case with the above-described earlier version of reverse air dust collectors described in U.S. Pat. No 3,951,627. As compared with the modified reverse air dust collector described above, it will be noted that the mounting arrangement of the present invention eliminates entirely the need for an expensive swivel joint between a stationary blower and a movable plenum, and also eliminates entirely the need for a 90-degree elbow and a transition pipe from the round configuration of the blower outlet and the square inlet for the plenum chamber, all of which significantly reduces the cost and complexity of the mounting arrangement. Also, the integrated mounting arrangement of the present invention eliminates several of the 90-degree turns in the flow path of the air as it is transmitted from the blower to the plenum, which significantly reduces frictional losses of the air flow and substantially increases the efficiency of the cleaning air generated by the blower. By virtue of these increased efficiencies, if a blower of the same size as that used in conventional dust collectors of the type described above is used with the present invention, the velocity of the cleaning air being discharged through the plenum nozzles 44 has a substantially greater velocity. As a direct result of this increased air flow, it is possible, with the present invention, to locate the plenum in spaced relation to the upper surface of the grid plate 14 (See FIG. 3), rather than requiring the plenum chamber 42 to "ride" along the upper surface of the grid plate 14. While this spacing between the plenum chamber 42 and the grid plate 14 results in some loss of cleaning efficiency because the air is not discharged directly into the openings 26 in the grid plate 14, the above-described increased efficiency of the cleaning air generated by the mounting arrangement of the present invention makes up for any such efficiency losses. Accordingly, the dust collector of the present invention can utilize a centrifugal blower of the same size and cost as in conventional reverse air dust collectors, and still obtain essentially the same cleaning efficiency while eliminating all of the difficulties created by an arrangement in which the plenum chamber actually rides along the surface of the grid plate.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a dust collector apparatus that includes a housing and a plurality of filter elements secured to a grid plate for receiving cleaning air through openings in said grid plate, and that includes a blower means having a drive motor integrally secured thereto for providing a continuous flow of cleaning air that is delivered to a plenum means for discharging said cleaning air into said openings in said grid plate, the improvement comprising:
(a) stanchion means disposed with its extending length arranged generally perpendicular with respect to said grid plate, said stanchion means being mounted in said housing for rotation about the axis of its extending length;
(b) mounting means for mounting said blower means, said blower means drive motor, said plenum means as a fixed integral unit to said stanchion means for rotation therewith, with said plenum being disposed on one side of said axis of rotation of said stanchion means and having its extending length disposed generally radially with respect to said axis of rotation and with said blower means and said blower means drive motor being disposed on the opposite side of said axis of rotation so that the weight of said blower means and said blower means drive motor will counterbalance at least in part the weight of said plenum means, said blower means having its air discharge end fixed to said plenum means so that air discharged from said blower means travels directly into said plenum means in a flow path that is essentially straight and directed along said extending length of said plenum means; and
(c) drive means for rotating said stanchion means, said plenum means, said blower means and said blower means motor as an integral unit about said axis rotation.

2. The improvement defined in claim 1, and further characterized in that said blower means is a centrifugal blower having a rotating impeller means and in that air discharger end of said blower is disposed generally tangential with respect to the path of said rotating impeller.

3. The improvement defined in claim 1, and further characterized in that said drive means includes a driven gear fixed to said stanchion means for rotation therewith, a rotatable drive gear for engaging said driven gear to rotate said stanchion means, and movable means mounting said drive gear for selective movement between a fixed position engaging said driven gear and a second position disengaged from said driven gear.

4. The improvement defined in claim 3, and further characterized in that said movable means includes a pivot plate having said drive gear mounted thereon, said pivot plate being mounted on a pivot shaft for pivotal movement between said fixed and second positions.

5. The improvement defined in claim 4, and further characterized in that said pivot plate and said pivot shaft are arranged so that the weight of said pivot plate and elements mounted thereon contribute the sole force for urging said pivot plate toward said fixed position thereof, and in that said weight is within a predetermined range that causes said drive gear to engage said driven gear in driving relation at said fixed position during movement operations and to permit said driven gear to move to said second position whenever rotation of said stanchion means is prevented.

6. In a dust collector apparatus that includes a housing and a plurality of filter elements secured to a grid plate for receiving cleaning air through openings in said grid plate, and that includes a blower means providing a continuous flow of cleaning air that is delivered to a plenum means for discharging said cleaning air into said openings in said grid plate, the improvement comprising:
(a) hollow stanchion means disposed with its extending length arranged generally perpendicular with respect to said grid plate, said stanchion means being mounted in said housing for rotation about a vertical axis along its extending length;
(b) mounting means for mounting said blower means and said plenum means as a fixed integral unit to said stanchion means adjacent the bottom end thereof for rotation therewith, with said plenum being disposed on one side of said axis of rotation of said stanchion means and having its extending length disposed generally radially with respect to said axis of rotation and with said blower means being disposed on the opposite side of said axis of rotation and having its air discharge end fixed to said plenum means so that air discharged from said blower means travels directly into said plenum means in a flow path that is essentially straight and directed along said extending length of said plenum means;
(c) means for delivering electrical current to said blower means including an electrical line connected to said blower means and extending through said hollow stanchion means, and a slip ring means disposed adjacent said stanchion means and arranged to transmit electrical current to said electrical line during rotation of said stanchion means; and
(d) drive means for rotating said stanchion means, said plenum means and said blower means as an integral unit about said axis of rotation.

* * * * *

UNITED STATES PATENT AND TRADEMARK OFFICE
CERTIFICATE OF CORRECTION

PATENT NO.  :  4,878,926

DATED       :  November 7, 1989

INVENTOR(S) :  Robert L. Goodrich

It is certified that error appears in the above-identified patent and that said Letters Patent is hereby corrected as shown below:

Column 5, Line 21, delete "wil" and insert therefor -- will --.

Column 7, Line 9, after "motor," add -- and --.

Signed and Sealed this

Ninth Day of June, 1992

Attest:

DOUGLAS B. COMER

*Attesting Officer*   Acting Commissioner of Patents and Trademarks